United States Patent [19]
Held

[11] Patent Number: 4,802,837
[45] Date of Patent: Feb. 7, 1989

[54] APPARATUS FOR PRODUCING PROCESSED WOOD MATERIAL PANELS

[76] Inventor: Kurt Held, Alte Str. 1, D-7218 Trossingen 2, Fed. Rep. of Germany

[21] Appl. No.: 120,355

[22] Filed: Nov. 13, 1987

[30] Foreign Application Priority Data

Nov. 14, 1986 [DE] Fed. Rep. of Germany ....... 3639061

[51] Int. Cl.[4] .............................................. B29C 43/22

[52] U.S. Cl. .................................... 425/230; 425/371; 425/405.1

[58] Field of Search ....................... 425/81.1, 289, 297, 425/302.1, 308, 371, 396, 405.1, DIG. 60, 73, 80.1, 831, 506, 511-520, 445, 446, 230; 264/109.82, 83

[56] References Cited

U.S. PATENT DOCUMENTS

| | | | |
|---|---|---|---|
| 1,185,399 | 5/1916 | Hayes | 425/371 |
| 2,575,092 | 11/1951 | Bouvier et al. | 425/371 |
| 3,313,010 | 4/1967 | Betz | 425/371 |
| 3,325,859 | 6/1967 | Goldstein | 425/371 |
| 3,586,573 | 6/1971 | Vissers | 425/371 |
| 4,263,007 | 4/1981 | Battigelli et al. | 425/371 |
| 4,710,333 | 12/1987 | Murakami | 425/371 |
| 4,718,843 | 1/1988 | Carlsson et al. | 425/371 |

*Primary Examiner*—Willard Hoag

*Attorney, Agent, or Firm*—Toren McGeady & Associates

[57] ABSTRACT

Apparatus for forming particle board and having plural opposed continuous belts and means to introduce a hardener in fluid form in the nip between the belts. The production of wood material particles into board or panels, such as chipboard, fiber board, OSB panels, MDF panels and the like, involves coating the particles with a binder free of any hardener. The coated particles are deposited on a support surface in the form of a mat and then are compressed. While the particles are being compressed in a press, an acid or basic hardener in a gaseous phase or in a binary phase with a gaseous carrier agent, is introduced across and into the surface of the mat or directly into the interior mat. The compression of the mat can be performed either in a continuous double band press or a discontinuous single or multiplaten press. In a double band press, two press bands are arranged in opposed relation and the hardener is introduced into the mat in a wedge-shaped inlet zone between the press bands. The hardener flows through openings in the press band onto the surface of the mat. Conduits are located in pressure plates associated with the press and bores extend from the conduits to the pressure plate surfaces in contact with the mat.

101 Claims, 9 Drawing Sheets

APPARATUS FOR PRODUCING PROCESSED WOOD MATERIAL PANELS

BACKGROUND OF THE INVENTION

The present invention is directed to a method of and apparatus for the production of processed wood material board or panels, such as chipboard, fiberboard, OSB panels, MDF panels and the like, including coating the wood material particles with a binder resin, such as urea, melamine, or phenolformaldehyde resins. The coated wood material is spread on a support surface in the form of a mat. The mat is transported through a press where the wood material is compacted and hardened due to the presence of a hardener.

Processed wood material board or panels, such as chipboard, fiberboard OSB-panels or MDF-panels comprises wood chips, wood fibers and the like bonded by a binder. Known binders are urea, melamine, and phenolformaldehyde resins. The wood material is scattered to form a mat and is then compressed or compacted in a press to form a compact board or panel. To accelerate the setting or hardening procedure, heat can be supplied during the pressing operation and a hardening agent can be added to the binder before it is applied to the wood material. Increasingly, continuous processes are being used for producing processed wood material panel where in place of a discontinuous multiple platen press, a continuous double band press is used. In such continuous processes, the mat is subjected to an area pressure with the possible addition of heat as the mat is transported through the double-band press so that the processed wood material panel is produced as a continuous web.

Since wood particles are poor conductors of heat, it has been known in applying binders, which cure or set by the application of heat, to supply hot gases or superheated steam to the mat of wood material in the press for plasticizing the wood particles and for heating the binder. Such a process, which utilizes a continuous band press with two endless revolving press bands, is described in DE-OS No. 20 58 820. In the process, superheated steam is introduced into the wedge-shaped inlet region of the double band press where the mat is compressed through the medium of pressure plates and the steam-permeable press bands. The pressure plates have nozzles or slots arranged in rows extending transversely of the travel direction of the double-band press for supplying steam and the press bands are formed of a wire mesh or perforated steel strip.

In another Patent Publication DE-OS No. 34 11 590, an installation is disclosed using a double-band press for fabricating processed wood material panels where the hardening is effected with steam. In this apparatus, distribution and collection channels are arranged on both sides of the press bands in the inlet region of the double-band press with nozzle bores directed toward the pressing gap located between the press bands. Superheated steam is introduced from distributing channels through the press bores into the long sides of the mat. A process utilizing a discontinuous multi-platen press also adds superheated steam through the pressure plates into the mat and is disclosed in Patent Publication DE-OS No. 34 14 178. To increase the setting speed of the binder and thereby shorten the compressing period, it has been known to add hardening agents or catalyzers to the binder before the binder is applied to the wood material. Strong acids, note U.S. Pat. No. 4,044,087, or bases are known as being particularly violent reacting hardeners for the generally-utilized duroplastic binders.

Because of the increase in the setting speed due to the hardener, an undesirable premature hardening without a corresponding application of pressure may occur with a loose interconnection of the chips while the mat is being formed. To counteract such a situation, usually strong or violent hardeners are not used, rather more slowly reacting hardeners are employed which react only in the presence of large quantities of heat. Such a procedure, however, results in an extended compressing period which leads to a low production output in the discontinuous process. In a continuous production, a long and thus expensive double band press must be utilized because of the long compressing period to achieve somewhat satisfactory production output. The addition of heat by means of steam results in a high humidity content in the processed wood material panel and must subsequently be removed in a drying process. Furthermore, high energy consumption is necessary for the generation of the superheated steam.

Continuous plants for the production of processed wood material panels using steam for increasing the setting speed are known and have certain disadvantages. In the plant disclosed in the Patent Publication DE-OS No. 34 11 590, the steam is added in the inlet zone through the longitudinal edges of the mat. Since the defusion capacity of the steam across the mat width, that is transversely of the passageway direction between the press bands, is limited, it has been possible to produce only narrow chipboards. The uniform application of steam with a corresponding uniform curing or setting is not assured and results in high rejection rates. Since only narrow processed wood material panels or boards of perfect quality can be produced, the output of such a plant remains small. Accordingly, economical production in such plants is not possible.

In Patent Publication DE-OS No. 20 58 820, a plant is disclosed providing a more uniform distribution of steam across the width of the apparatus and a more uniform setting or curing across the width of the processed wood material boards, however, the arrangement for supplying steam through the pressure plates and the pressure bands into the mat is very expensive. If the press bands are supported at the pressure plates by rollers or rolls, the rollers rotate in a steam atmosphere, exposing the rollers to a great danger of corrosion. Usually, the lubricant used for the rollers tends to decompose in a steam atmosphere so that after a short operating period, the rollers become scored. In the past, such presses have been found to be undependable in operation and, accordingly, are hardly utilized.

SUMMARY OF THE INVENTION

The primary object of the present invention is to provide a method of and apparatus for the production of processed wood material panels which greatly reduces the time period required for the compressing operation and also reduces the supply of heat. In a continuous process, utilizing a double-band press, shorter press bands can be used. The wood particle material is initially supplied coated with a resin free of any hardener, then the mat formed of the material is introduced into the press and the hardener is provided in the form of one of a acid hardener or a basic hardener with the hardener either in the gaseous phase or in a binary phase with a gaseous carrier agent with the hardener directed across the outer surface of the mat or directly into the interior of the mat. In the apparatus, means are located in the inlet zone of the press for supplying the acid or basic hardener into the mat entering the passageway between the press bands.

In accordance with the present invention, either no steam at all is required or a greatly reduced amount is used, so that the energy expenditures for production are considerably reduced. With the time period for the compressing operation greatly reduced compared to conventional continuous or discontinuous plants, the production output is increased. When a double band press is employed, the gaseous or steam atmosphere can be isolated from the rollers, avoiding any danger of destruction or damage to the rollers or other components of the double band press by corrosion, and also avoiding the possibility of decomposition of the lubricant with a corresponding reduction in the lubricating effect.

In the past, double band presses for the production of processed wood material panels have, as a rule, had a length of between 16 and 25 meters. In accordance with the present invention, the length of the double band press with equal production output can be reduced to approximately 4 to 6 meters. Capital costs, as well as operating costs, of such a double band press are very considerably reduced. In addition, the operational reliability of the over-all plant is improved.

Furthermore, the curing of the process with material panels using an acid or basic gaseous hardener can be controlled in a metered manner in an advantageous way.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

The method of the present invention can be performed with a continuously operating plant for producing a continuous processed wood material panel web, as well as in a discontinuous plant for producing processed wood material panels of a fixed dimension. As a rule, continuous processes are performed in a double-band press, while discontinuous processes use a single or a multi-platen press.

Figure 1:
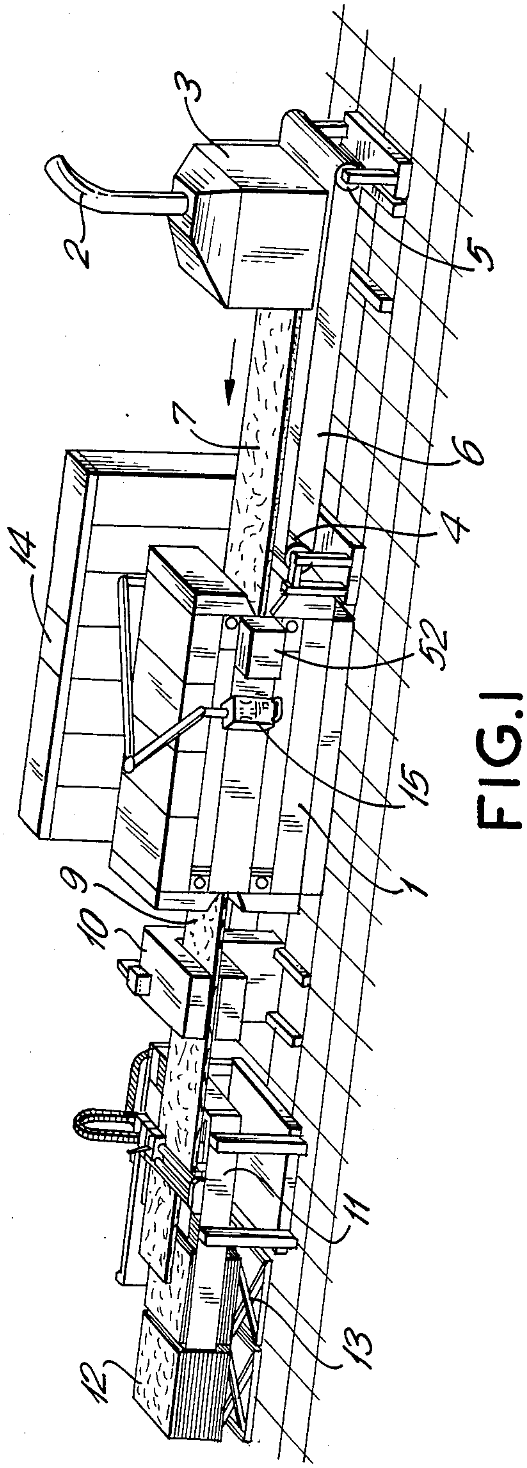
FIG. 1 is a prospective view of a plant for the continuous production of processed wood material panels embodying the present invention.

A plant operating in accordance with the present invention for the continuous production of chipboard is displayed in FIG. 1. The processed wood material or wood chips are prepared in apparatus located upstream of the double-band press. The chips are pretreated and binder free of hardener is supplied to the chips. Such apparatus is known and, therefore, is not disclosed in the drawing. Wood chips coated with a binder are supplied through a pipeline 2 to a molding station 3. Molding station 3 is located above the end of a conveyor belt 6 shown at the right hand end in FIG. 1, and the belt is stretched over two reversing rollers 4, 5 which move continuously in the direction of the arrow, that is the upper run of the conveyor belt 6 moves to the left toward a double band press 1. In the molding station 3, wood chips coated with binder and free of any hardener are spread on the conveyor belt 6 in a mat form or chip cake 7. The placement of the wood chips can be effected so that a multi-layer chip cake 7 is formed with the cover layers made up of fine chips and the middle layer or layers of coarse chips.

Chip cake 7 is transported by the conveyor belt 6 in the direction of the arrow to the double band press 1. Between the molding station 3 and the double band press 1, additional devices may be positioned, such as are known and, therefore, not shown in FIG. 1. For instance, such devices may include control means for measuring the area weight of the chip cake, prepressing means and the like. At the end of the conveyor belt 6, adjacent the double band press 1, a transfer member is arranged adjacent the reversing roller 4, for guiding the chip cake 7 from the conveyor belt into the inlet zone of the double band press 1.

As the chip cake 7 enters the double band press, it is compacted by the application of pressure in a continuous manner down to the final thickness of the board. During the compaction or compression, a hardening agent for the binder is applied to the wood chips in a gaseous form or in a binary phase with a gaseous carrier agent flowing into the double band press to the surface of the chip cake 7. The gas penetrates through the surface of the chip cake 7, since during the compression phase the cake still has a low density. For the usual binders, such as urea, melamine, and formaldehyde resins, utilized in the fabrication of chipboard, strong inorganic or organic acids act as particularly rapid hardening agents and greatly accelerate the curing or setting reaction of the resin. Examples of such acids are as follows:

Hydrochloric acid
Sulfuric acid
Phosphorous acid
Formic acid
Acidic acid
Maleic acid and the like For phenol-formaldehyde resin or resorcinol resin, used as a binder in chipboard production, inorganic basic material acts as a rapid hardener. An example of such a basic hardener is ammonia. For additional acceleration of the curing reaction, heat can be supplied to the binder along with the gaseous hardener through conduits in the double band press 1. The compression of the chip cake is followed by an average pressure phase and a lower pressure phase in the double band press and during movement through these phases the compressed chip cake 7 cures or sets into a continuous chipboard web. A cooling zone can be provided at the outlet from the double band press 1, so that the web is cooled in the press under the effect of area pressure. Chipboard web 9 exits from the outlet of the double band press with a uniform velocity and receives further processing at stations located downstream of the press. If necessary, the chipboard web 9 can be passed through an additional cooling device for further cooling, however, such a device is not shown in FIG. 1. Subsequently, the chipboard web 9 undergoes a grinding operation in a grinding station 10 to provide the web with its finished dimensions. Next, the chipboard web 9 is divided at a transversely extending cutting station 11 into individual chipboard panels 12 of the desired size and the cut panels 12 are stacked on pallets in a stacking device 13 for shipment.

The entire sequence in the plant shown in FIG. 1, including spreading the chip cake 7 in the molding station, the input of the process parameters of the double band press and the process of maintaining the parameters at constant values, and the division of the chipboard 9 into individual panels, is controlled by a computer located in a switch gear cabinet 14. Data terminal 15 serves for the input of parameters by the operator. The computer in the switch gear cabinet 14 can be connected to an external host computer located in a central electronic data processing unit for controlling the production and feedback of the information data for additional evaluation by the central unit.

Figure 2:
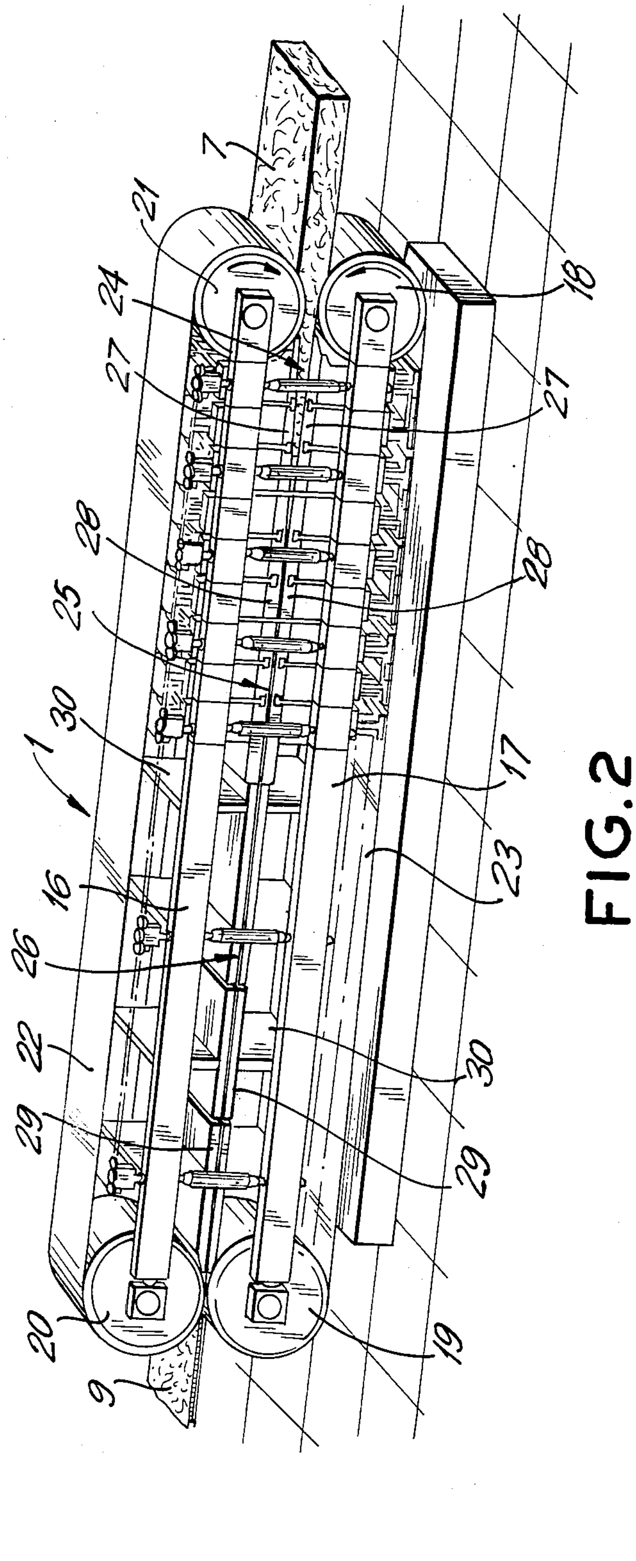
FIG. 2 is a prospective view of a double band press operating in accordance with the present invention.

FIG. 2 provides a diagrammatic showing of the double band press 1 for the continuous production of chipboard. Double band press 1 includes four reversing drums 18, 19, 20, 21 rotatably supported in bearing blocks 16, 17. The double band press 1 is formed of two press bands 22, 23, one located above the other in spaced relation providing a passageway through which the chip cake 7 moves during processing within the press. Each press band 22, 23 extends around a pair of reversing drums 21, 20 and 18, 19 respectively. The movement of the reversing drums s shown by the arrows on the ends of the drums 18, 21. The chip cake 7 moves through the double band press 1, between the lower run of the upper press band 22, and the upper run of the lower press band 23. Initially, the chip cake 7 is compressed in a wedge-shaped inlet zone 24, at the right-hand end of the press as viewed in FIG. 2, then it moves into an average pressure reaction zone 25, with a constant gap width of the passageway between the press bands and then passes through a low pressure shape maintenance zone 26, at the lefthand end of the double band press. Finally the compressed chipboard web 9, exits from the double band press 1, at the outlet end located at the reversing drums 19, 20. The pressure or compression is exerted in the individual zones 24, 25 and 26 by pressure plates 27, 28 and 29, located immediately above the lower run of the upper press band 22 and immediately below the upper run of the lower press band 23. The pressure exerted by the pressure plates 27, 28 and 29 is selected as required for the chip cake 7 and for the type of resin coating the chip material. The reaction forces generated by the chip cake 7 are transmitted into the diagrammatically illustrated press 1 through the pressure plates 27, 28 and 29 and by the support beams 30, extending transversely of the press bands and extending upwardly or downwardly from the pressure plates. The design of the press stand is known from patent publication DE-OS No. 32 34 082 and further description is not required.

Figure 3:
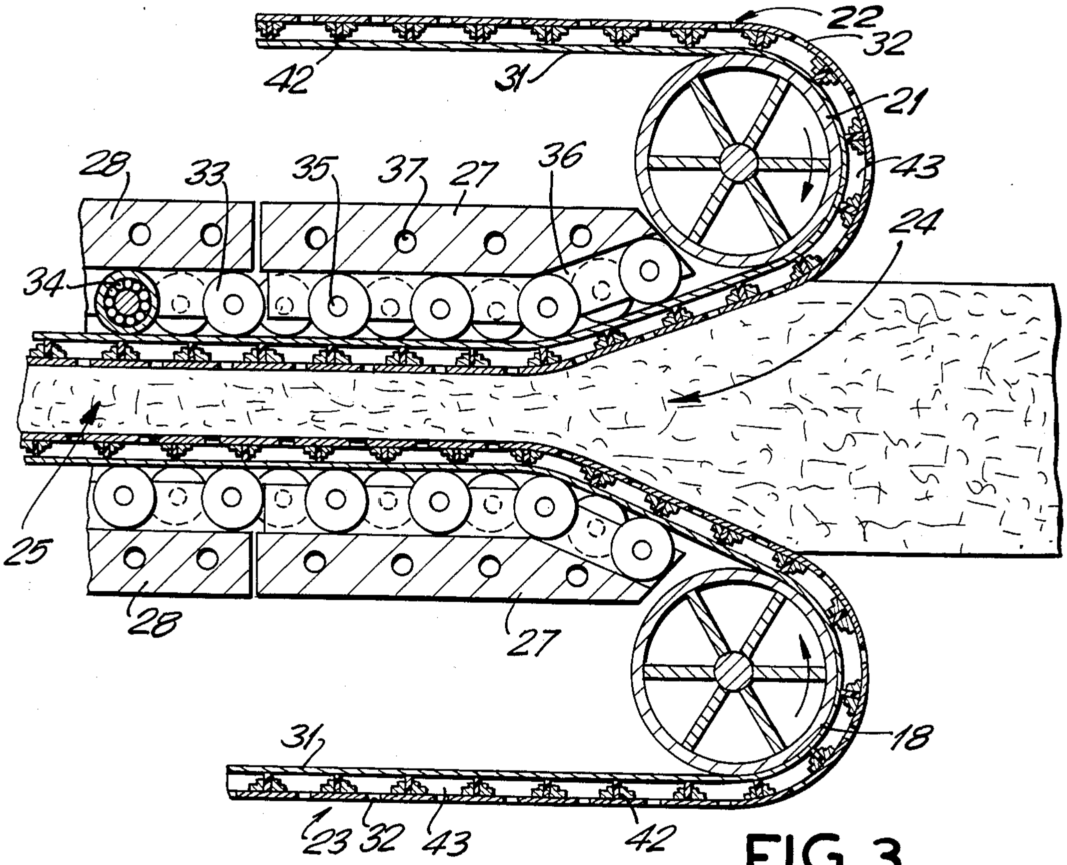
FIG. 3 is a sectional view in the direction of travel through a double band press illustrating the inlet region of the press.

The structure of the pressure plates 27, 28 is set forth more clearly in FIG. 3. At its right-hand end, pressure plate 27 is wedge-shaped with the wedge surface converging inwardly toward the passageway between the press bands 22, 23. The wedge-shaped ends of the pressure plate 27 in the region of the reversing drums 18, 21 define the configuration of the wedge-shaped inlet zone 24. Pressure plate 28 defines the average pressure reaction zone 25 and has a rectangular cross-section. A roller bed is located between the pressure plates 27, 28 and an inner band 31 of the press bands 22, 23 Each press band 22, 23 is formed of an inner band 31 and an outer band 32 with the inner band contacting the rollers and the outer band contacting the chip cake 7. The roller bed transmits the pressure of the compressing or compacting procedure from the pressure plates 27, 28 to the press bands 22, 23. The roller bed is stationery in the double band press 1, and is made up of rollers 33 staggered relative to one another and supported by needle roller bearings 34 on shafts 35, note the left-hand roller in the upper band 22. Shafts 35 are secured in support strips 36 and the strips are fastened to the pressure plates 27, 28 along the edges spaced outwardly from the inside band 31. For a further description of such a roller bed, attention is directed to the Patent Publication DE-OS No. 31 23 271 and DE-OS No. 33 04 754. Bores 37 extending transversely of the direction of movement of the mat through the passageway between the press bands 22, 23 are located in the pressure plates 27, 28 and thermal oil can be passed through the bores for heating the pressure plates 27, 28, if necessary.

Figure 4:
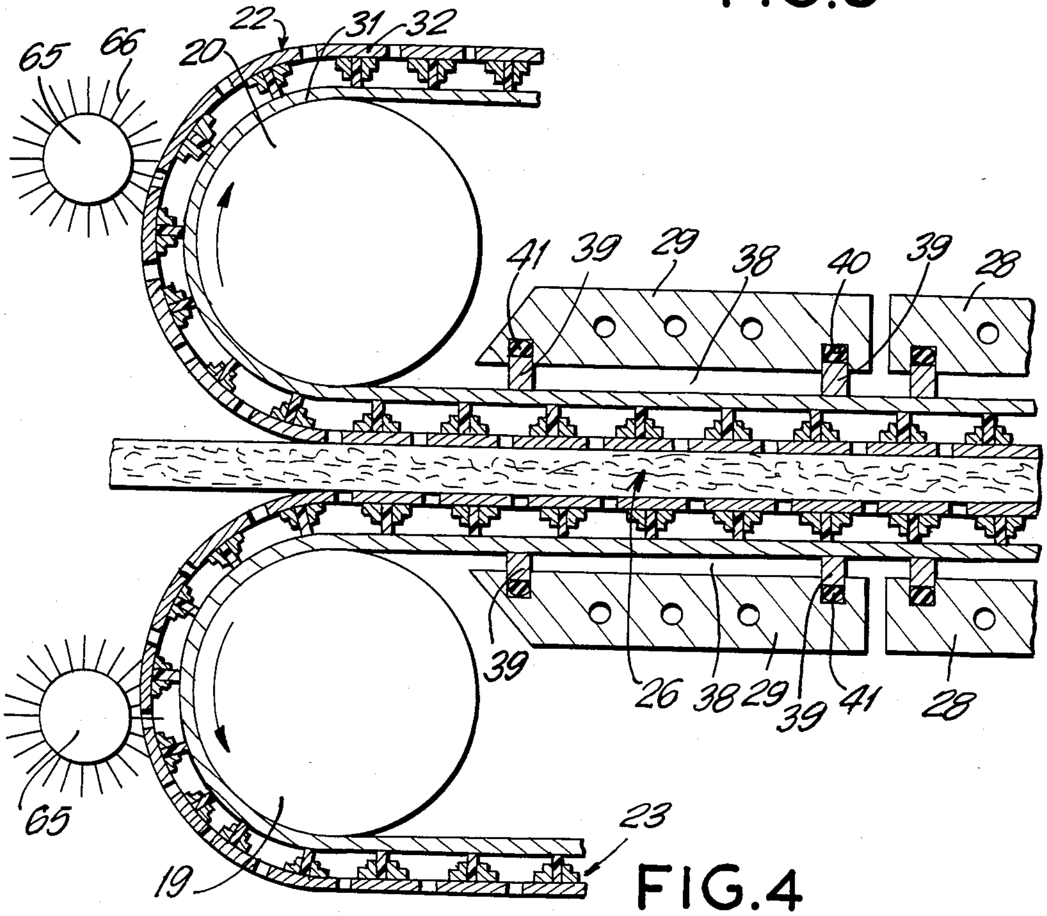
FIG. 4 is a sectional view of a double band press taken in the direction of travel of the press and displaying the outlet region.

In the low pressure-shape maintenance zone 26, a similar roller bed can be provided between the pressure plates 29 and the inside band 31. As an alternative, a pressure chamber 38 can be provided, as shown in FIG. 4, between the pressure plates and the inside bands. Pressure chamber 38 is bounded around its sides by a floating packing 39, extending continuously around the edges of the pressure chamber. Floating packing 39 fits into a groove 40 in the pressure plate 29 and pressure is provided from the base of the groove 40 and the pressure acts on an O-ring shaped member 41 bearing against the floating packing 39, so that the floating packing contacts the surface of the inner band 31 in a sliding manner. A pressurized medium is introduced into the pressure chamber and exerts the required pressure upon the press bands 22, 23. Generally, since no additional compaction of the chip cake 7 occurs in the average pressure reaction zone 25, such a pressure chamber 38, if desired, can be used in place of the roller bed between the pressure plate 28 and the corresponding inner band 31.

As displayed in FIG. 3, the inner band 31 and the outer band 32 of the press bands 22, 23, are spaced from one another. The spacing is maintained constant by spacers 42 shown fastened to the outer band 32 and extending transversely across the width of the outer band. Between two adjacent spacers 42, a cavity or channel 43 is formed with the channel also being defined by the surfaces of the inner band 31 and the outer band 32, disposed in facing relation. As a result, the cavity or channel 43 extends across the width of the press bands 22, 23.

Figure 5:
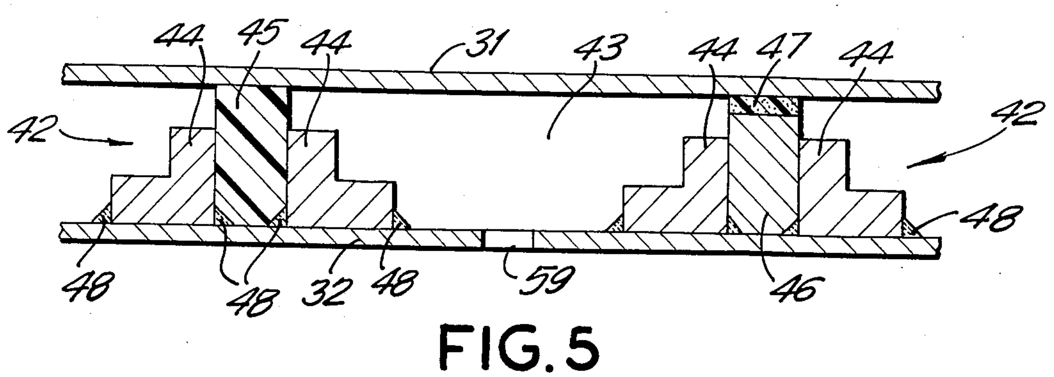
FIG. 5 is a sectional view in the direction of travel of the press displaying the press band arrangement in the double band press.

Spacer 42 is shown in greater detail in FIG. 5. The spacer 42 is formed of two L-shaped members disposed in spaced relation. One leg of each member 44 is connected with the inner surface of the outer band 32 by a weldment 48. A floating member 45 is positioned between the legs of the members 44 extending toward the inside surface of the inner band 31. While the end of the legs are spaced from the inner band, the floating member 45 has a narrow face at its opposite edges in contact with the inner band 31 and the outer band 32. The height of the floating member 45 is selected to exactly match the spacing between the inner and outer bands 31, 32. In the region of the reversing drums 18, 19, 20 and 21 and the transition region between the inlet zone 24 and the average pressure reaction zone 25, there is a slight relative velocity between the inner band 31 and the outer band 32. Because of this difference in velocity, the floating member 45 slides at its narrow face or surface on the inner band 31. To maintain the frictional forces as low as possible, the floating member 45 is formed of a plastics material with good anti-friction properties, such as polyamides.

Another embodiment of the floating member 45 can be noted from the spacer 42, displayed on the right-hand side in FIG. 5. The floating member in this embodiment includes a metal body 46 extending upwardly from the outer band 32 with an anti-friction member 47 applied to its surface spaced from the inner band 31 so that the anti-friction layer bears against the inner band. The low friction layer 47 is a dry antifriction member, for instance porous sintered tin bronze with pores filled with polytetrafluoroethylene or graphite. Due to the good metallic heat conductivity of such anti-friction layers, this arrangement is particularly suitable if heat transmission from the pressure plate to the inner band, from the inner band to the outer band, and from the outer band to the chip cake is desired. For the further reduction in friction between the floating member 45 and the inner band 31, the surfaces can be lubricated. It is also possible to weld the L-shaped members 44 to the inner band 31 so that the floating member 45 or 47 slides on the surface of the outer band 32.

Figure 6:
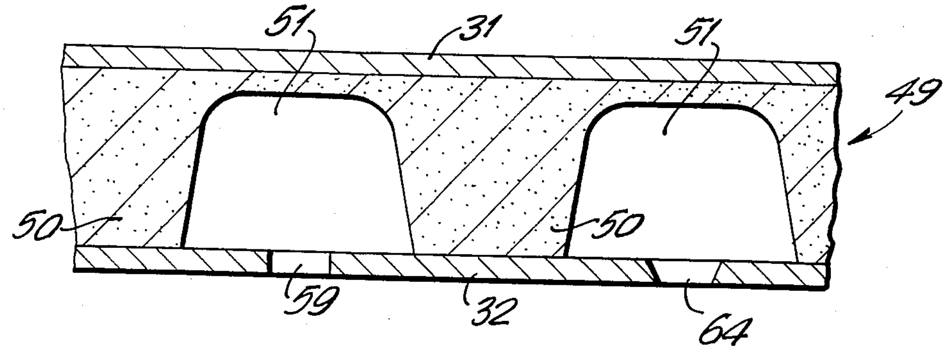
FIG. 6 is a view, similar to FIG. 5, illustrating another embodiment of a spacer in the press band.

Still another embodiment of the spacer is shown in FIG. 6. The spacer between the inner band 31 and the outer band 32 is a single molded part 49. Molded part 49 is formed of a metal-rubber compound and is especially suited to an arrangement where no heat is supplied by the pressure plates 27, 28 through the press bands 22, 23 to the chip cake 7, in the formation of the chipboard web. Molded part 49 is fastened to the inner band 31 and has alternating webs 50 and channels 51. The height of the webs 50 correspond exactly to the spacing between the inner band 31 and the outer band 32. The channels 51 extend transversely of the travel direction of the press bands and are located between a pair of adjacent webs 50. The channel 51 opening is directed toward the outer band 32. The webs 50 are interconnected along the side adjacent the inner band.

Figure 10:
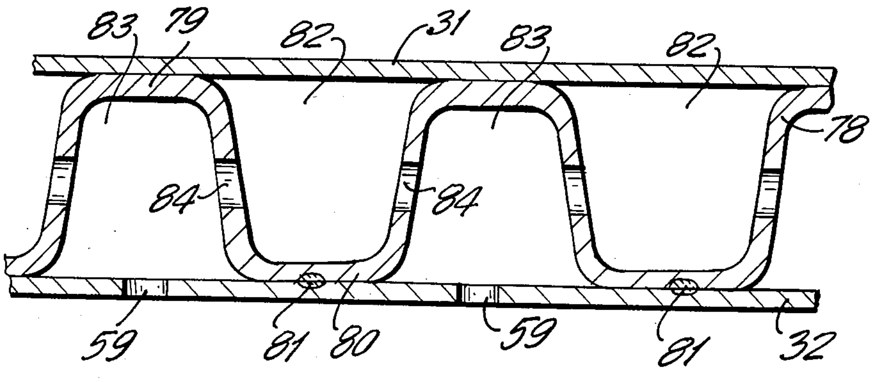
FIG. 10 is a view similar to FIGS. 5 and 6 illustrating still another embodiment of a spacer in the press band.

Still another embodiment of the spacer is exhibited in FIG. 10. Between the facing surfaces of the inner band 31 and the outer band 32, of the press bands 22, 23, there is a tortuously shaped support strip 78 having a wave form or approximately sine-curved shape with alternating lands 79 and grooves 80 of the same height or depth. Support strip 78 is guided loosely against the inner band and the outer band or, as shown in FIG. 10, the support strip can be secured to the outer band by point welds 81 at the grooves 80. Alternatively, the point welds could be provided at the lands 79, not shown. In the lands 79 and grooves 80, transversely extending channels 82, 83 are formed with the channels 83 being open toward the outer band 32. The transversely extending channels 82, 83 are in flow communication via bores 84 located in the flanks extending between the channels.

In accordance with the present invention, a basic hardener for binding the binder coated chips of the chip cake 7 is supplied in a gaseous state or in a binary state with a gaseous carrier agent in the wedge-shaped inlet zone 24 where the chip cake is compressed. For supplying the hardener, as is shown diagrammatically in FIG. 1, a supply device 52 is located along the opposite sides or edges of the wedge-shaped inlet zone 24. Supply device 52 is shown in section in FIG. 7. Supply device 52 can be formed of two separate parts **52*a* and 52*b* for the upper and lower press bands 22, 23 as shown on the left-hand side in FIG. 7, or it can be formed as a single part displayed on the right-hand side in FIG. 7. The unitary supply device 52 has the advantage that the opposite edges of the inlet zone 24** are sealed.

Figure 7:
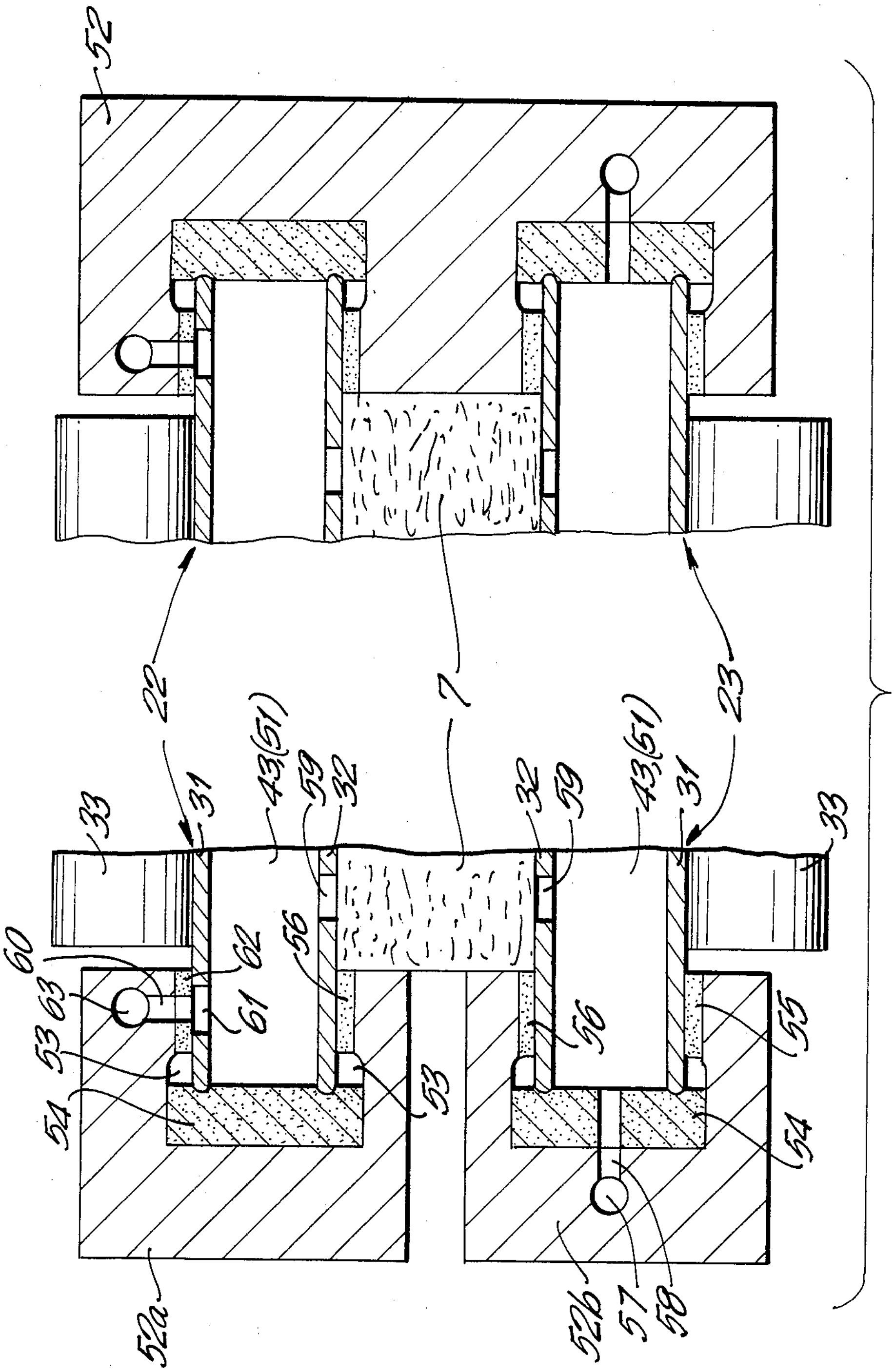
FIG. 7 is a transverse sectional view of a for supplying acid hardener into the inlet region of the double band press.

The supply device 52; **52*a*; 52*b* embraces the edges of the press bands 22, 23 which project laterally outwardly from the rollers 33 of the roller bed, note FIG. 7. A recess 53 is located in the supply device, in the region of the press band 22 and of the press band 23, with the height of the recess being somewhat greater than the space of the inner band 31 from the outer band 32 and its depth is somewhat greater than the projecting portion of the press bands 22, 23. At the vertical wall of the recess 53, there is a sealing element 54 which contacts the edges of the inner band 31 and the outer band 32 with a slight pressure. Further, the sealing element forms a cover for the edges of the laterally-extending channel 43, 51. Sealing element 54 is formed of a metal-rubber member, such as Viton. Two dry anti-friction members 55, 56 are located at the horizontal walls of the recess 53 with the member 55 sliding on the projecting edge of the inner band 31 and the anti-friction member 56 sliding on the projecting edge of the outer band 32. The dry anti-friction members 55, 56 can be formed of a copper metal matrix having pores filled with graphite or with tin bronze. The transversely extending channels 43, 51 located in the press bands 22, 23 are dynamically sealed against the supply device 52 in the wedge-shaped inlet zone 24 by the dry anti-friction members 55, 56 as well as by the sealing element 54. In the supply device 52, a conduit 57 extends in the travel direction of the double press band, that is, the feed direction of the chip cake 7, and transversely extending bores 58 are connected at one end to the conduit 57 and move inwardly through the sealing element 54, opening into the channels 43, 51. The term transversely refers to a direction lying perpendicularly to the travel direction of the press band, that is, the feed direction of the chip cake 7. The acid or basic hardener in gaseous form or in a gaseous carrier agent is introduced through the conduit 57 in the supply device 52. The hardener flows from the conduit 57 through the bores 58 into the channels 43, 51. The channels 43, 51 are filled dynamically with the gas containing the hardener as long as they remain in the region of the wedge-shaped inlet zone 24. Openings in the outer band 32, spaced apart in the travel direction and the transverse direction of the band flow the gaseous hardener or the gaseous carrier agent containing the hardener from the channels 43, 51 to the surface of the chip cake 7 so that the hardener flows into the chip cake. Since the chip cake within the wedge-shaped inlet zone 24**, is not completely compressed or compacted, the gaseous medium can penetrate into the center of the chip cake and initiate the action of the binder with the chips and accelerate the setting or curing process.

Duroplastic resins used as the binder afford, as a rule, an additional acceleration of the curing by the addition of heat. The gaseous medium can be used as a carrier for the heat. If the hardening agent is in the gaseous state, the hardener gas can be heated before it is introduced into the channels 43, 51. If the hardener is supplied in a binary state with a gaseous carrier means, then the carrier means can be appropriately heated. A neutral gas, that is one which does not react with the acid or basic hardener, such as air or a rare gas, can be utilized as the gaseous carrier means. Moreover, steam is suitable as a gaseous carrier means and the steam can be superheated. If additional heat is needed for the chip cake, the press bands 31, 32 can be heated so that heat is transmitted via conduction to the chip cake 7 from the surface of the outer band 32 in contact with the chip cake. Another embodiment for supplying the hardener into the channel 43, 51 is provided in the portion of the supply device part **52*a*, cooperating with the press band 22. Bores 60 pass vertically downward from a conduit 63 for conveying the hardener through the dry anti-friction member 62. In this region, the inner band 31 of the press band 22 has inlet openings 61 in the form of slots so that the hardener can flow into the channels 43, 51**.

Openings 59 in the outer band 32 convey the gaseous hardener or the carrier gas from the channel 43, 51 into the chip cake 7. The openings 59 are spaced in the travel direction and in the transverse direction with the spacing being determined based on the amount of hardener required per unit time. The apertures can be circular or slot shaped with the slots extending in the travel direction. The use of slots has been found to be particularly expedient with the width of the slots in the transverse direction being approximately 0.1 to 0.2 mm. Such slots have a trapezoidal cross-section with the sides of the slot converging inwardly toward the surface the chip cake, note the slot 64 shown in FIG. 6. The trapezoidal cross-section of the slot 64 acts as a nozzle for the gaseous hardener directed into the chip cake. The slots 64 can be formed in the outer band by a laser. Because of the openings or slots 59, 64, slight burrs may be present on the surface of the chipboard after the completion of its passage through the double band press which may be in the form of raised chips. Such burrs are removed in the grinding station 10 by a grinding strip after the chipboard web 9 has left the double band press, note FIG. 1.

The openings or slots 59, 64 can become clogged after a short time by resin residue from the chip cake 7. To prevent blockage of the openings or bores 59, 64 in the outer band 32 of the press bands 22, 23, they are cleaned after the outer band leaves the low pressure shape maintenance zone 26 and the chipboard web 9 has exited from the double band press. A roller 65, as shown in FIG. 4, is provided with teeth 66 projecting outwardly from the roller. The teeth 66 penetrate into the openings or slots 59, 64 and remove the residual resin lodged in the openings or slots. Roller 65 is carried along by the movement of the press bands 22, 23. Because of the engagement of the teeth in the openings or bores, the roller does not require its own, drive. Resin residue is pushed by the teeth 66 int the channels 43, 51 and can be removed from the channels by a suction device constructed in the same manner as the supply device **52*a*, 52*b* in FIG. 7**.

The suction device is mounted at the exit of the double band press downstream in the direction of travel of the press bands 22, 23 from the rollers 65. The conduits 57, 63 are connected to a vacuum source so that the resin residue is drawn out of the channels 43, 51 through the bores 58, 60 and the conduits 57, 63.

Figure 11:
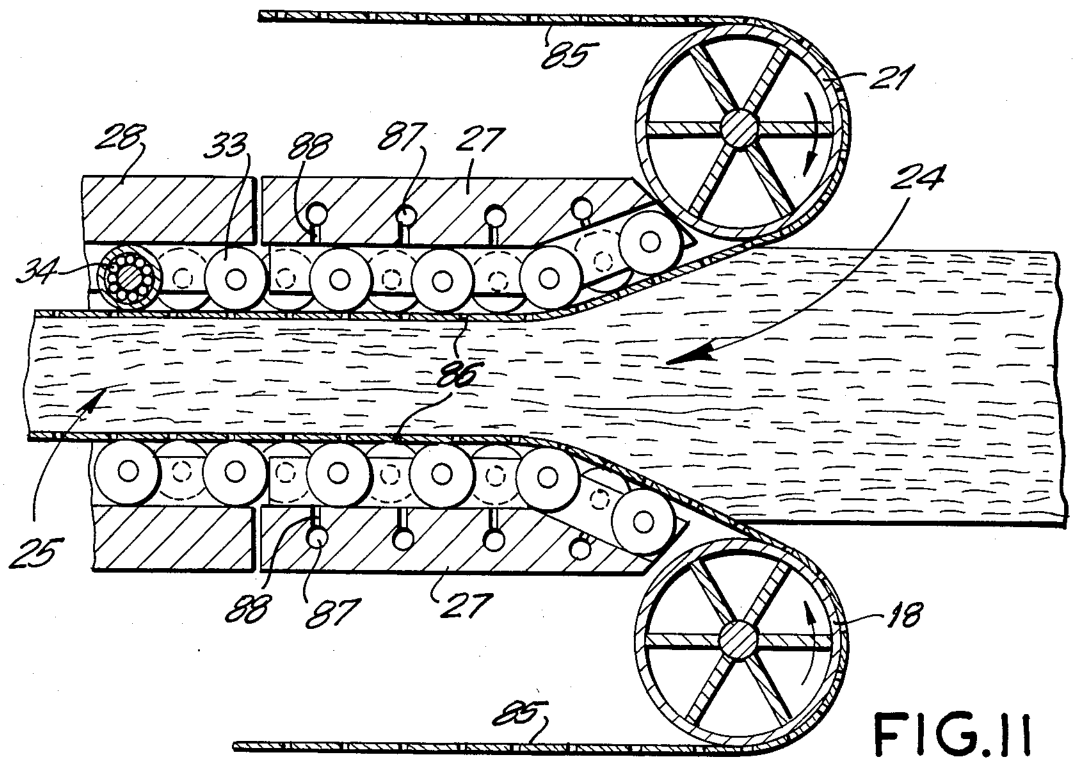
FIG. 11 is a sectional view taken in the direction of travel of the double band press at the inlet region and exhibiting another embodiment of the present invention.

If a lubricant, inert with respect to the acid or basic hardener, is used for lubricating the rollers 33 in the wedge-shaped inlet zone 24, then the design of the double band press can be simplified. The inlet region of such a simplified double band press is shown in FIG. 11. In this embodiment, the upper and lower press bands are each formed of a simple press band 85 containing openings 86. The pressure plates 27 are provided with conduits 87 in the region of the wedge-shaped inlet zone 24 and the acid or basic hardener in the gaseous phase or in a binary phase with a gaseous carrier agent is supplied into the conduits. Bores 88 extend transversely from the conduits 87 and flow the hardener into the roller bed. In the roller bed, the hardener flows over the rollers and through the openings 86 to the surface of the chip cake. The hardener then flows from the chip cake surface into its interior and accelerates the curing reaction of the binder coated on the chip cake. A supply device 52 for the hardener as described above is not necessary in this embodiment. Moreover, the cost for a second press band and the spacers is also eliminated.

Figure 8:
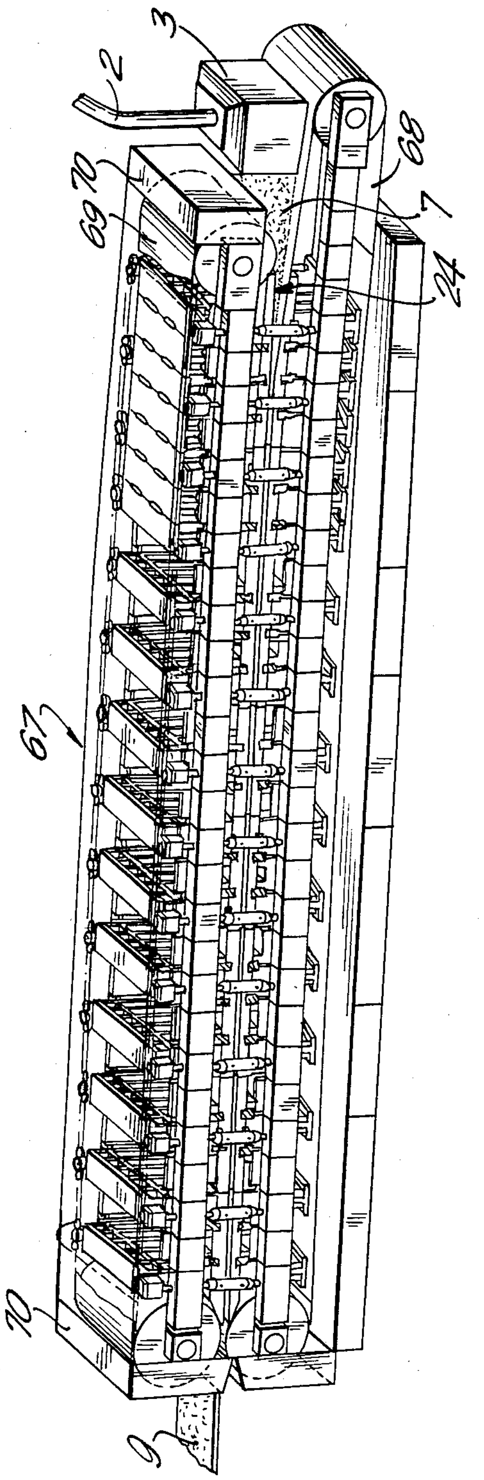
FIG. 8 is a prospective view of a double band press operable in accordance with the present invention.

Another embodiment of a double band press for the continuous production of chip webs 9 is shown in FIG. 8. Double band press 67 is constructed similar to the one shown in FIG. 2. In the double band press 67, however, lower press band 68 projects outwardly to the right, as viewed in FIG. 8, beyond the end of the upper press band 69, accordingly, the lower press band extends outwardly from the enclosure 70 about the entire double band press 67. The spreading or molding station 3, is located above the outwardly projecting portion of the lower press band 68. In the station 3, the wood chips coated with binder and free of hardener are spread on the lower press band 68 to form the mat or chip cake 7. Subsequently, the chip cake 7 is conveyed by the lower press band into the wedge-shaped inlet zone 24 and during the compressing stage, the acid or basic hardener in gaseous form or in a binary phase with a gaseous carrier agent is added in accordance with the description of the invention above.

The wedge-shaped inlet zone 24 into the double band press as shown in FIGS. 2 and 8 is designed to be symmetrical about a central horizontal plane, in other words, the press bands can merge inwardly toward one another at the same angle relative to the central horizontal plane. It is also possible to provide a different angle for the upper and lower press bands. Moreover, only one of the upper and lower press bands forming the inlet zone may be arranged in a wedge-shaped manner.

Figure 12:
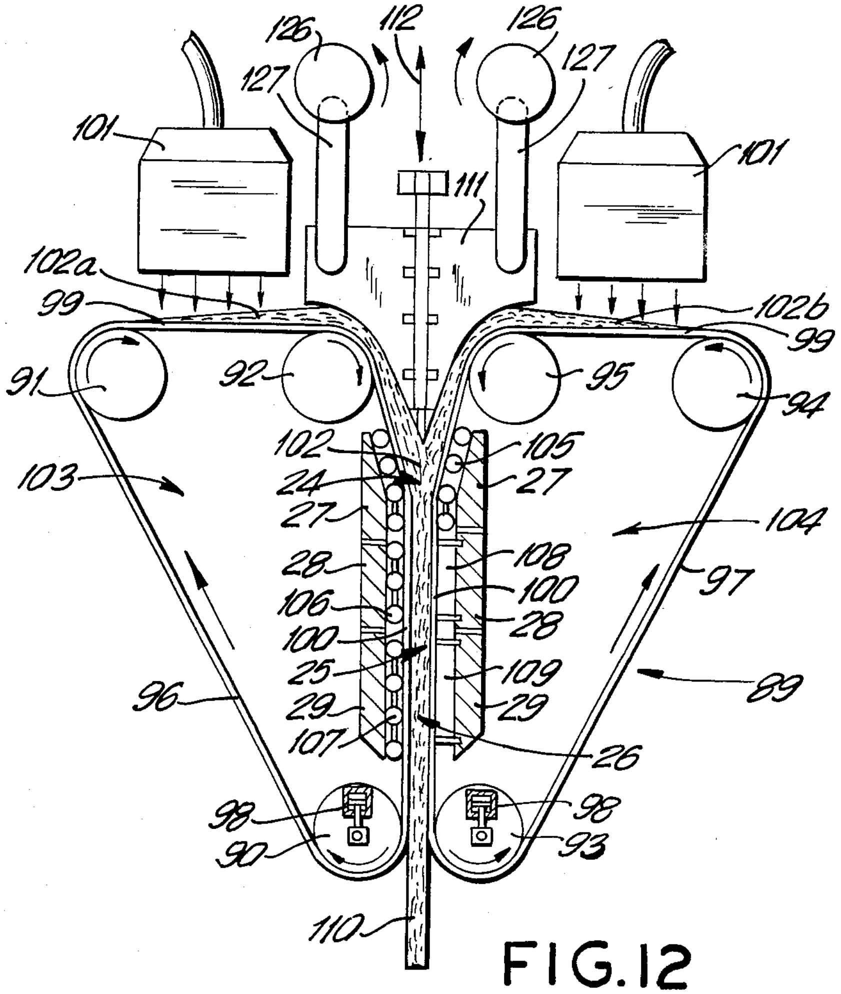
FIG. 12 is a diagramatic view of a vertically-arranged double band press operating in accordance with the present invention.

In another plant for carrying out the present invention, the double band press is arranged vertically as shown in FIG. 12. Double band press 89 with its long axis or direction of travel oriented vertically, includes six reversing drums, 90, 91, 92, 93, 94, 95 with three reversing drums assigned to each of the press bands 96, 97. Reversing drums 90, 91 and 92 support the press band 96 of the double band half 103 located on the left-hand side and the reversing drums 93, 94, 95 of the press band 97, form the right-hand double band half 104. Basically, the reversing drums 90, 91, 92 and 93, 94 and 95 are arranged at the corners of a triangle and rotate in the direction indicated by the arrows on the drums. The press bands 96, 97 travel around the reversing drums 90, 91, 92 and 93, 94, 95 and the bands are stretched by hydraulic cylinders 98, note the drums 90 and 93. Accordingly, each band has a horizontal section 99, and a vertical section 100. The vertical sections 100 form the wedge-shaped inlet zone 24 at the upper ends of the vertical sections with the average pressure reaction zone 25 and the low pressure shape maintenance zone 26 following the inlet zone in the downward direction.

One-half of the chip cake **102*a* is supplied by the spreading station 101 onto the horizontal section 99 of the left-hand press band 103 and the other half of the chip cake 102*b* is supplied by the spreading station 101 onto the horizontal section 99 of the right-hand press band 104. The chip cake half 102*a* is conveyed initially by the press band 96 in the horizontal direction to the right as viewed in FIG. 12 and the other chip cake half 102*b* is conveyed initially in the horizontal direction by the press band 97 to the left and the two halves then move downwardly in the vertical direction after passing the reversing drums 92, 95. In the region of the reversing drums 92, 95, the two chip cake halves 102*a*, 102*b* combine to form a single chip cake 102, which is conveyed downwardly by the two press bands 96, 97 in the vertical direction through the wedge-shaped inlets zone 24**.

The press bands 96, 97 are formed by two press bands spaced apart by spacers 42, that is, an inner band 31 and an outer band 32 as shown in FIG. 5. The gaseous acid or basic hardener is introduced into the wedge-shaped inlet zone by the supply part 52, as shown in FIG. 7, with the hardener flowing through openings 59 in the outer band 32 onto the surfaces of the chip cake 102, and subsequently penetrating into the chip cake.

The compacting pressure is transmitted in the wedge-shaped inlet zone 24 through a roller bed 105 from the pressure plate 27 to the inner band 31 of the press bands 96, 97. Viewed in the vertical direction, as the press bands 96, 97 move forwardly in the downward direction, the average pressure reaction zone 25 and the downstream low pressure shape maintenance zone 26 follow the inlet zone 24. In the average pressure reaction zone 25 and the low pressure maintenance zone 26, the compressing force can also be transmitted from the pressure plates 28, 29 through a roller bed 106, 107 to the press bands 96, 97 as shown in FIG. 12 from the left-hand band 103. Alternatively, the compressing force can be transmitted through pressure chambers 108, 109 to the press bands 96, 97 as illustrated on the right-hand side of the band 104. The press stand on which the vertically-arranged band halves 103, 104 are supported, is not shown in FIG. 12 for reasons of clarity.

After the chip cake 102 has been conveyed through the average pressure reaction zone 25 and the low pressure maintenance zone 26, it exits the double band press 89, in the region of the reversing drums 90, 93 in the form of a cured chip board web 110. Subsequently, the chipboard web 110 can be processed in the vertical direction. A compacting piston 111 is arranged across the entire width of the double band press 89 in the region of the reversing drums 92, 95 at the entry into the wedge-shaped inlet zone 24, note in FIG. 12 that the piston is wedge-shaped. Piston 111 oscillates in the vertical direction, as shown by the double-headed arrow 112, and compacts the chip cake directly at the entrance into the wedge-shaped inlet zone 24. The compacting piston 111 acts as a prepress, so that the prepress can be eliminated in the embodiment described. The oscillating motion of the piston 111 can be generated by two synchronously moving eccentrics 126 with the motion of the eccentrics transmitted to the piston 111 by link rods 127. If desired, the chip cake can be spread only on one of the horizontally extending segments of the vertically arranged double band press 89 shown in FIG. 12, that is, either on the left-hand or right-hand band half 103, 104.

Figure 13:
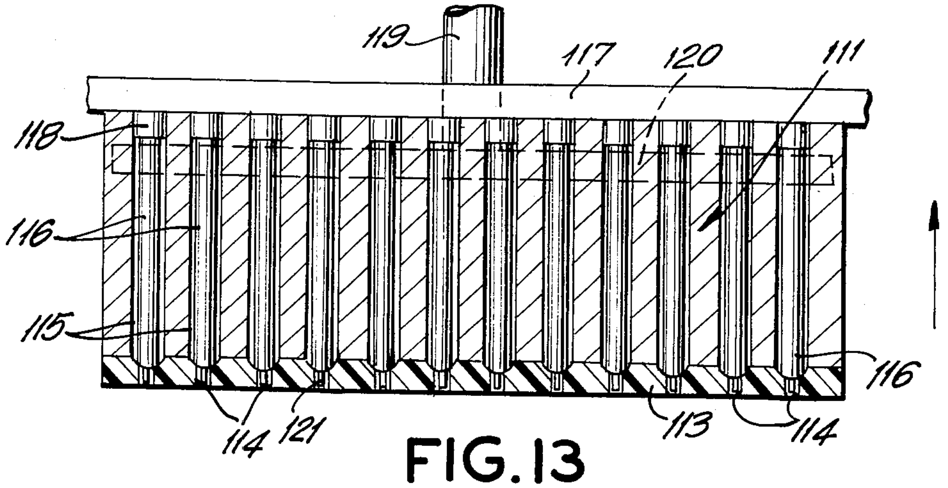
FIG. 13 is a sectional view through a compressing piston taken in the transverse direction and shown in the closed state.
Figure 14:
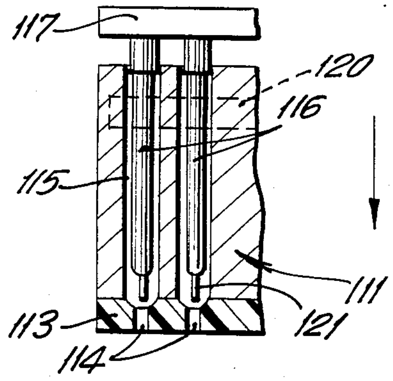
FIG. 14 is a partial sectional view similar to FIG. 13, however, displaying the compressing piston in the open state.

In another embodiment of the present invention, the supply device 52 for the hardener can be eliminated as shown in FIGS. 13, 14. Compacting piston 111 in its lower portion forms a wedge-shaped tip, and a sealing element 113 extends continuously across the tip and contains continuous nozzle bores 114 arranged adjacent to one another. Nozzle bores 114 are fed from vertical guide tubes 115 extending through the compacting piston 111 with the tubes being open at the top. A shut-off needle 116 is located in each guide tube 115, with the upper end of each needle connected to a rack 117 rigidly fastened to the double band press 89. Compacting piston 111 oscillates in the vertical direction relative to the rack 117.

In the upper reversal point in the movement of the compacting piston 111, the shut-off needles 116 close the nozzle bores 114, note FIG. 13. The upper opening of the guide tubes 115 is also closed by an increased diameter section 118 at the upper end of the shut-off needles 116. In the lower reversal point in the movement of the compacting piston 111, openings of the nozzle bores are completely opened by the shut-off needles 116, while the upper openings of the guide tubes 115 remain closed due to the increased thickness parts 118, as shown in FIG. 14.

The acid or basic hardener in gaseous form or in a binary phase with a gaseous carrier agent is supplied through a main line 119 to a manifold line 120 located in and extending across the compacting piston 111. Guide tubes 115 are supplied with the hardener from the manifold 120. During the vertically downward compacting movement of the piston 111, the openings into the nozzle bores 114 are uncovered and the acid or basic hardener flows into the middle of the chip cake 102. Subsequently, when the compacting piston 111 moves upwardly, the shut-off needles 116 seal the nozzle bores so that additional hardener is not released into the chip cake 102. Accordingly, the hardener is applied to the chip cake only during the compacting phase. Since the hardener in gaseous form is introduced into the middle of the chip cake 102 by the compacting piston, there is no diffusion from the surface of the chip cake 102 into its interior and the curing reaction is further accelerated. If desired, it is also possible to provide additional hardener to the surface of the chip cake by a supply device 52.

Shut-off needles 116 have tips 121 at their lower ends. In the movement of the compacting piston 111 vertically upwardly, tips 121 move into the nozzle bores 114 and eject resin residues outwardly which clog the nozzle bores. If the acid or basic hardener is supplied to the chip cake 102 only by the compacting piston 111, then the openings 59 in the outer bands 32 can be eliminated. Moreover, it is sufficient if the press bands 22, 23 contain only a single press band rather than an inner and outer band.

Figure 15:
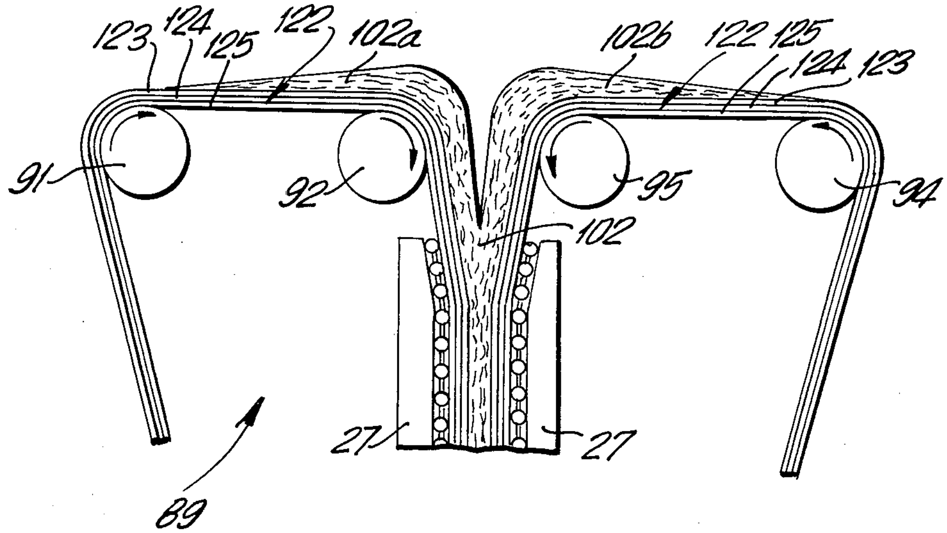
FIG. 15 is a partial vertical section through the inlet region in a vertically-arranged double band press using multilayer press bands.

If the acid or basic hardener is supplied to the chip cake only through the compacting piston 111, then the double band press 89 can be formed by multi-layer band units 122. As shown in FIG. 15, illustrating in section the inlet region of a vertically-arranged double band press, the multi-layer band units 122 are formed of several superimposed press bands 123, 124 and 125 with no spacing between the press bands. Press bands 123, 124, 125 have no openings, since hardener is not supplied to the chip cake to the press bands. Such multi-layer band units 122 have a higher tensile strength than simple press bands and are less sensitive to damage by foreign bodies entrained in the chip cake, such as resin chunks, small metal particles, stones and the like. The number of press bands forming the multi-layer band unit 122 can be selected as required. The remaining arrangement of the multi-layer band unit can be formed in accordance with DE-OS No. 27 35 142.

It should be noted that the press bands 22, 23 are not limited to use in double band presses for the production of processed wood material webs. Such press bands 22, 23 can also be used with particular advantage in double band presses for producing web-shaped materials at increased temperatures. In previous double band presses, press band temperatures up to 220° C. have been reached. At higher temperatures, the lubricant for the rollers 33 of the roller bed decomposes within a very short time if a roller-supported double band press is used. In a double band press utilizing a pressure equalizing plate, the known materials for the anti-friction seal 39 remain stable only up to that temperature so that temperatures higher than 220° C. have not in the past afforded a reliable operation. Certain materials are known, such as duroplastic and thermoplastic synthetic materials which require pressing at temperatures of 350° C. or more. Up to the present time, such materials could not be fabricated in a continuous operation.

In a double band press embodying the present invention, the outer band 32 can be heated to the temperature required by the material being processed prior to entering the reaction zone. Inner band 31 is heated at most to a temperature acceptable for the lubricant or for the anti-friction seal 39. Since a space exists between the outer band 32 and the inner band 31, and air fills this space, that is, the channels 41, the air acts as a thermal insulator and very little heat is transferred from the outer band to the inner band. The only locations at which a heat flow occurs are at the spacers 42. In such a situation, however, the spacers can be formed with a plastics material, such as polyamide as the sliding ledge 45. If due to the high temperature of the outer band 32, a sliding ledge 45 formed of a plastics material cannot be used, then a sliding ledge formed of a metal member 46 with an anti-friction surface 47 could be employed. Accordingly, sliding ledges 45 are given as small a cross-section as possible, so that in the small cross-section, when compared to the entire surface of the press bands, only a minor heat flow takes place between the outer band and inner band which may be considered practically negligible. The inner band remains essentially at a lower temperature which is not harmful to the lubricant or to the anti-friction seals 39, while the outer band remains at a higher temperature. Accordingly, the flow of heat takes place, as desired, primarily into the material being produced. When such materials are being produced at increased temperature, no acid or basic hardener has to be added, accordingly, the supply device 52, the apertures 59, 64 in the outer band and the inlet opening 61 in the inner band can all be eliminated. If necessary, additional cooling can be provided for the inner band.

Figure 9:
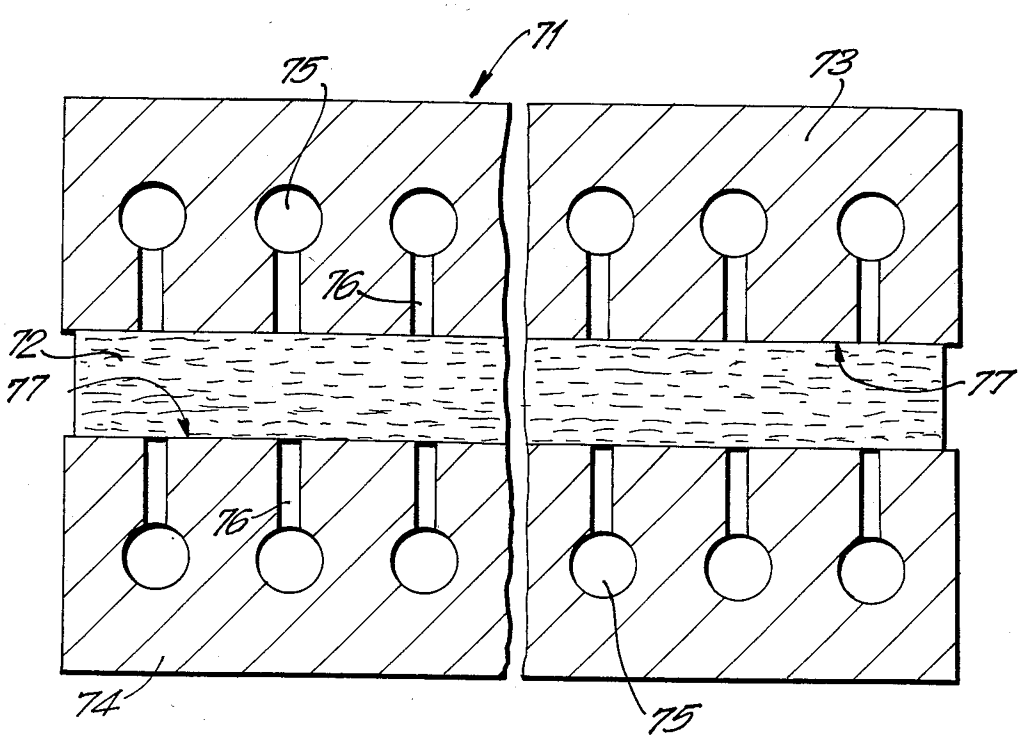
FIG. 9 is a transverse sectional view through a part of a device for the discontinuous production of a processed wood material panel.

A discontinuously operating device, acting in accordance with the method of the present invention is shown in FIG. 9. This device consists of a multiple-platen press 71. The chips coated with a binder free of any hardener, are spread to form a chip cake, are divided into chip cake sections, and then conveyed into the multiple-platen press in a cyclically-timed manner. Such a device is known and further description is unnecessary. In the multiple-platen press 71, as displayed in section in FIG. 9, in the transverse direction, chip cake 72 is compressed when the pressure plates 73, 74 are closed and during pressure build-up. In the compressing phase, the gaseous acid or basic hardener or the hardener with the gaseous carrier agent is supplied through the pressure plate 73, 74 to the surface of the chip cake 72 where it penetrates into the chip cake and triggers the curing reaction of the binder.

Passageways 75 are machined in the pressure plate 73, 74 for the supply of the acid or basic hardener and the passages extend parallel to the s of the pressure plates. Vertically arranged bores 76, disposed in spaced relationship to one another in the long direction, extend from the passages 75 to the surfaces of the pressure plates 77, facing the chip cake 72, for conveying the hardener from the passages to the surface face of the chip cake 72. The bores 76 are shown for purposes of illustration with an exaggerated cross section and spacing. As soon as the compressing phase is completed, the supply of the hardener is interrupted. Subsequently, the chip plate is further processed under the influence of the retaining pressure until the binding agent is cured. Several vertical bores 76 located adjacent to one another can extend from one passage 75. Moreover, in this arrangement additional heat can be supplied to the chip cake via the gaseous hardener, the gaseous carrier agent or by means of heat conduction from the pressure plates 73, 74. If desired, the chip cake can be cooled at the same time it is exposed to the retaining pressure.

A single platen press is utilized for the discontinuous fabrication of chip panels. A discontinuous multi-platen press can be used in place of a single platen press. It is only important in such a case, that the acid or basic hardener in gaseous form or in a binary phase with a gaseous carrier agent is supplied during the compressing phase across the surface of the chip cake.

The method and apparatus of the present invention have been described in the production of chipboards. The method and apparatus are also suitable for the production of other processed wood material panels production from a chip or fiber material and a binder curable by acid or basic hardeners. Such additional processed wood material can be fiber panels, OSB panels or MDF panels.

While specific embodiments of the invention have been shown and described in detail to illustrate the application of the inventive principles, it will be understood that the invention may be embodied otherwise without departing from such principles.

I claim:

1. Apparatus for producing processed wood material as board or panels, such as chipboard, fiberboard, and the like, comprising means for supplying processed wood material to a support surface for forming a mat and for conveying the mat to a continuously operating double band press, said double band press comprising a first and a second endless press band located opposite one another and forming a passageway therebetween with an inlet at one end of said passageway and an outlet at the other end and a reaction zone extending between the inlet and the outlet ends, said press bands having spaced sides extending between the inlet and the outlet ends, at least two drums in spaced relation for supporting each said press band with said press band travelling over said drums, said press bands arranged to travel the mat through the reaction zone in said passageway, pressure plates arranged in the region of the reaction zone for transmitting pressure to said press bands, said reaction zone comprising a wedge-shaped inlet zone at the inlet end of said passageway, an average pressure reaction zone between said inlet zone and the outlet end, and a lower pressure zone between said average pressure zone and the outlet end, wherein the improvement comprises means located within the inlet zone for supplying one of an acid and basic hardener in one of a gaseous phase and a binary phase with a gaseous carrier agent into the mat in said inlet zone of said passageway.

2. Apparatus, as set forth in claim 1, wherein said first and second endless press bands each defining channels extending transversely of the direction of movement of the mat through said passageway for supplying the hardener and said first and second endless press bands defining openings in said first and second press band for conveying the hardener from the channels to said mat.

3. Apparatus, as set forth in claim 1, wherein said first and second endless press bands each comprise a single press band having openings therethrough, pressure plates in the region of the reaction zone having channels extending therethrough for supplying the hardener to the inlet zone and openings in said single press bands arranged to convey the hardener from the channels against the surface of said mat.

4. Apparatus, as set forth in claim 1, wherein each said press band comprises an inner press band and an outer press band with said inner and outer press bands disposed in spaced relation, and spacer means located between said inner and outer press bands for maintaining the spaced relation, in each said press band said inner press band being in contact with said drums and said outer press band being spaced outwardly from said drums and contacting the mat between the inlet and outlet ends of the passageway, said supply means comprises a supply device located in said inlet zone and extending along the sides of said press bands, said inner and outer press bands and said spacer means located therebetween forming channels extending transversely of the travel direction of said press bands, said supply device arranged to direct the one of the acid and basic hardener in one of the gaseous phase and binary phase with a gaseous carrier agent into said channels and said outer bands having openings therethrough for flowing the hardener from said channels through said outer band into contact with the surfaces of the mat.

5. Apparatus, as set forth in claim 1, wherein said second endless press band is located generally horizontally below said first endless press band and at the inlet end said second endless press band has a section projecting outwardly from said first endless press band providing the support surface for forming a mat, and said means for supplying processed wood material located above the projecting section of said second endless press band.

6. Apparatus for producing processed wood material into board or panels, such as chipboard, fiberboard, and the like, comprising means for supplying processed wood material to a support surface for forming a mat and for conveying the mat to a continuously operating double band press, said double band press comprises a first and a second endless press band located opposite one another and forming a passageway therebetween with an inlet at one end of the passageway and an outlet at the other end and arranged to travel the mat through said passageway, a plurality of drums disposed in spaced relation for supporting each said press band with said press band travelling over said drums, and a reaction zone extending between the inlet and outlet ends of the passageway, said press band having spaced sides extending between the inlet and outlet ends, pressure plates arranged in the region of the reaction zone for transmitting pressure to said press bands, said reaction zone comprising a wedge-shaped inlet zone at the inlet end, an average pressure reaction zone between said inlet zone and the outlet end, and a lower pressure zone between said average pressure zone and the outlet end, wherein the improvement comprises that said first and second endless press bands are arranged forming a vertically extending said passageway with each of said first and second endless press bands travelling over three said drums arranged at the corners of a triangle formed by the press band travelling over said drums, each said press band includes a horizontal section and a vertical section extending downwardly from said horizontal section with said vertical section forming one side of said passageway and said reaction zone, said horizontal sections each forming a part of said support surface for forming the mat, said inlet zone located at the upper end of said vertical section, and means located in the inlet zone suitable for supplying one of an acid and basic hardener in one of a gaseous phase and a binary phase with a gaseous carrier agent into the mat in said inlet zone of said passageway.

7. Apparatus, as set forth in claim 6, wherein each of said first and second endless press bands comprises an inner band and an outer band disposed in spaced relation with a plurality of spacers extending between said outer band and said inner band with said spacers extending transversely of and disposed in spaced relationship in the travel direction of said endless press bands and channels located between said inner and outer bands and said spacers with said channels extending transversely of the travel direction of said press band, and said means for supplying hardener arranged for flowing the hardener into said channels.

8. Apparatus, as set forth in claim 7, wherein said means for supplying processed wood material comprises a spreading station located above each of said horizontal sections for spreading processed wood material onto said horizontal sections so that two separate parts of the wood material are combined at said wedge-shaped inlet zone, and said means for supplying hardener comprises a supply device located along each of the opposite sides of said press bands for supplying the hardener into said channels, and said outer band of each said press band having openings therethrough arranged to flow the hardener from said channels to the surfaces of said mat within said inlet zone.

9. Apparatus, as set forth in claim 6, wherein a compacting piston is located in said inlet zone between said vertical sections of said press bands and extends across the width of said press bands between the sides thereof, and means for oscillating said compacting piston in the vertical direction for pre-compacting the material forming the mat as the material enters into said inlet zone.

10. Apparatus, as set forth in claim 9, wherein said compacting piston is wedge-shaped corresponding generally to said wedge-shaped inlet zone.

11. Apparatus, as set forth in claim 10, wherein said compacting piston has a wedge-shaped tip and a sealing element located at said wedge-shaped tip in contact wiht the mat, said sealing element extending continuously across said wedge-shaped tip in the direction between sides of said press bands, said sealing element has spaced vertical nozzle bores extending therethrough and disposed in side-by- side relation, vertical guide tube extending through said compacting piston and each opening to one of said nozzle bores, a manifold connected to said guide tubes, a main supply conduit for supplying the hardener into said manifold, and shut-off needles vertically displaceable in said guide tubes for opening and closing said nozzle bores.

12. Apparatus, as set forth in claim 11, wherein said shut-off needles have a lower end and an upper end and a rack connected to the upper ends of said shut-off needles, said rack being stationery and said compacting piston oscillating relative to said rack and said needles for effecting the opening and closing of said nozzle bores.

13. Apparatus, as set forth in claim 12, wherein said guide tubes have an upper end, an extension secured to the upper end of each said shut-off needle and being arranged to close the upper ends of said guide tubes.

14. Apparatus, as set forth in claim 12, wherein the lower ends of said shut-off needles have tips and said tips being movable relative to said nozzle bores for ejecting resin residues from the nozzle bores.

15. Apparatus, as set forth in claim 12, wherein each of said first and second press bands comprises a multi-layer band unit with each said unit comprising a plurality of superimposed press bands free of any openings.

16. Apparatus, as set forth in claim 6, wherein said wedge-shaped inlet zone comprises a pair of oppositely converging surfaces, each converging at the same angle relative to said passageway.

17. Apparatus, as set forth in claim 1, wherein said wedge-shaped inlet zone comprises a pair of oppositely converging surfaces, each converging at the same angle relative to said passageway.

18. Apparatus, as set forth in claim 1, wherein said wedge-shaped inlet zone has a pair of oppositely converging surfaces formed by said press bands with said surfaces converging each at a different angle relative to the passageway formed by said press bands.

19. Apparatus, as set forth in claim 6, wherein said wedge-shaped inlet zone has a pair of oppositely converging surfaces formed by said press bands with said surfaces converging each at a different angle relative to the passageway formed by said press bands.

20. Apparatus, as set forth in claim 1, wherein said wedge-shaped inlet zone is formed by a pair of converging sides provided by the surfaces of said press bands, and only one of said surfaces disposed at an angle to said passageway formed between said press bands.

21. Apparatus, as set forth in claim 6, wherein said wedge-shaped inlet zone is formed by a pair of converging sides provided by the surfaces of said press bands, and only one of said surfaces disposed at an angle to said passageway formed between said press bands.

22. Apparatus, as set forth in claim 4, wherein a stationary roller bed is located between and in contact with said pressure plate and said inner band in the region of the wedge-shaped inlet zone.

23. Apparatus, as set forth in claim 7, wherein a stationary roller bed is located between and in contact with said pressure plate and said inner band in the region of the wedge-shaped inlet zone.

24. Apparatus, as set forth in claim 4, wherein a stationary roller bed is located in the region of the average pressure reaction zone between and in contact with said pressure plate and said inner band for transmitting pressure to the mat within said passageway.

25. Apparatus, as set forth in claim 7, wherein a stationery roller bed is located in the region of the average pressure reaction zone between and in contact with said pressure plate and said inner band for transmitting pressure to the mat within said passageway.

26. Apparatus, as set forth in claim 1, wherein means for forming a pressure chamber located between one said pressure plate and one said inside band in the average pressure reaction zone, and said means forming said pressure chamber includes an anti-friction seal sealing the edge of the pressure chamber.

27. Apparatus, as set forth in claim 6, wherein means for forming a pressure chamber located between one said pressure plate and one said inside band in the average pressure reaction zone, and said means forming said pressure chamber includes an anti-friction seal sealing the edge of the pressure chamber.

28. Apparatus, as set forth in claim 1, including means forming a pressure chamber between one said pressure plate and one said inner band in the lower pressure zone, and anti-friction sealing means forming a seal around said pressure chamber.

29. Apparatus, as set forth in claim 6, including means forming a pressure chamber between one said pressure plate and one said inner band in the lower pressure zone, and anti-friction sealing means forming a seal around said pressure chamber.

30. Apparatus, as set forth in claim 4, wherein said spacer means being secured to the surface of said outer band opposite the surface contacting the mat.

31. Apparatus, as set forth in claim 7, wherein said spacers being secured to the surface of said outer band opposite the surface contacting the mat.

32. Apparatus, as set forth in claim 4, wherein said spacer means being fastened to said inner band.

33. Apparatus, as set forth in claim 7, wherein said spacers being fastened to said inner band.

34. Apparatus, as set forth in claim 4, wherein said spacer menas being welded to one of said inner band and outer band.

35. Apparatus, as set forth in claim 7, wherein said spacers being welded to one of said inner band and outer band.

36. Apparatus, as set forth in claim 4, wherein said spacer means comprises a pair of L-shaped members in spaced relation in the travel direction of the press bands extending across between said inner and outer band between the sides thereof and a sliding strip clamped between said L-shaped members and extending between and into contact with the facing surfaces of said inner and outer band.

37. Apparatus, as set forth in claim 7, wherein said spacers comprises a pair of L-shaped members in spaced relation in the travel direction of the press bands and extending across between said inner and outer band between the sides thereof and a sliding strip clamped between said L-shaped members and extending between and into contact with the facing surfaces of said inner and outer band.

38. Apparatus, as set forth in claim 36, wherein said sliding strip has a rectangular cross-section in the travel direction of said press bands and has a pair of narrow faces and a pair of wide faces, with said narrow faces contacting the surface of said inner band and said outer band.

39. Apparatus, as set forth in claim 37, wherein said sliding strip has a rectangular cross-section in the travel direction of said press bands and has a pair of narrow faces and a pair of wide faces, with said narrow faces contacting the surface of said inner band and said outer band.

40. Apparatus, as set forth in claim 38, wherein said sliding strip is formed of a plastics material with good anti-friction properties.

41. Apparatus, as set forth in claim 39, wherein said sliding strip is formed of a plastics material with good anti-friction properties.

42. Apparatus, as set forth in claim 40, wherein said plastics material is a polyamide.

43. Apparatus, as set forth in claim 41, wherein said plastics material is a polyamide.

44. Apparatus, as set forth in claim 38, wherein said sliding strip is formed of metal with an anti-friction coating on one of said narrow faces thereof so that said coating contacts one of said inner band and outer band.

45. Apparatus, as set forth in claim 39, wherein said sliding strip is formed of metal with an anti-friction coating on one of said narrow faces thereof so that said coating contacts one of said inner band and outer band.

46. Apparatus, as set forth in claim 44, wherein said anti-friction coating is a dry anti-friction coating.

47. Apparatus, as set forth in claim 45, wherein said anti-friction coating is a dry anti-friction coating.

48. Apparatus, as set forth in claim 46, wherein said dry anti-friction coating comprises a porous sintered tin bronze having pores therein with one of polytetrafluoroethylene and graphite embedded into the pores.

49. Apparatus, as set forth in claim 47, wherein said dry anti-friction coating comprises a porous sintered tin bronze having pores therein with one of polytetrafluoroethylene and graphite embedded into the pores.

50. Apparatus, as set forth in claim 4, wherein said spacer means comprises a unitary molded part attached to said inner band and comprising spaced webs having a dimension between said inner and outer bands corresponding to the spacing between said inner and outer bands with a channel located between each pair of adjacent said webs with said webs and said channels extending transversely of the travel direction of said press bands.

51. Apparatus, as set forth in claim 7, wherein said spacers each comprise a unitary molded part attached to said inner band and comprising spaced webs having a dimension between said inner and outer bands corresponding to the spacing between said inner and outer bands with a channel located between each pair of adjacent said webs with said webs and said channels extending transversely of the travel direction of said press bands.

52. Apparatus, as set forth in claim 50, wherein said molded part comprises a continuous base in contact with said inner band and interconnecting said webs.

53. Apparatus, as set forth in claim 51, wherein said molded part comprises a continuous base in contact with said inner band and interconnecting said webs.

54. Apparatus, as set forth in claim 50, wherein said

55. Apparatus, as set forth in claim 51, wherein said molded part is formed of a metal rubber compound.

56. Apparatus, as set forth in claim 4, wherein said spacer means comprises a continuous tortuously-shaped band with said band forming alternating lands and grooves with said lands contacting said outer band and said grooves contacting said inner band and said alternating lands and grooves forming channels extending between said sides of said press bands.

57. Apparatus, as set forth in claim 7, wherein said spacers comprise a continuous tortuously-shaped band with said band forming alternating lands and grooves with said lands contacting said outer band and said grooves contacting said inner band and said alternating lands and grooves forming channels extending between said sides of said press bands.

58. Apparatus, as set forth in claim 56, wherein said support band has openings therethrough interconnecting adjacent said channels.

59. Apparatus, a set forth in claim 57, wherein said support band has openings therethrough interconnecting adjacent said channels.

60. Apparatus, as set forth in claim 56, wherein said support band is in contact with and is free of connection with the inner and outer bands.

61. Apparatus, as set forth in claim 57, wherein said support band is in contact with and is free of connection with the inner and outer bands.

62. Apparatus, as set forth in claim 56, wherein said support band is fastened at said lands by weldments to said outer band.

63. Apparatus, as set forth in claim 57, wherein said support band is fastened at said lands by weldments to said outer band.

64. Apparatus, as set forth in claim 56, wherein said support band is fastened at the grooves by weldments to said inner band.

65. Apparatus, as set forth in claim 57, wherein said support band is fastened at the grooves by weldments to said inner band.

66. Apparatus, as set forth in claim 4, wherein said supply device is a unitary member suitable for supplying hardener to both said press bands.

67. Apparatus, as set forth in claim 7, wherein said means for supplying hardener is a unitary member suitable for supplying hardener to both said press bands.

68. Apparatus, as set forth in claim 4, wherein said supply device for the hardener is formed of a first part and a second part with said first part arranged to supply hardener to one said press band and said second part arranged to supply hardener to the other said press band.

69. Apparatus, as set forth in claim 7, wherein said means for supplying hardener is formed of a first part and a second part with said first part arranged to supply hardener to one said press band and said second part arranged to supply hardener to the other said press band.

70. Apparatus, as set forth in claim 4, wherein said supply device has a recess therein located opposite each of said sides of said press bands in said wedge-shaped inlet zone in contact with the mat, a sealing element located within said recess for contact with the sides of said press band, and conduit means in said supply device for conveying the hardener into said recess for flow therefrom between said inner and outer bands.

71. Apparatus, as set forth in claim 7, wherein said means for supplying hardener has a recess therein located opposite each of said sides of said press bands in said wedge-shaped inlet zone in contact with the mat, a sealing element located within said recess for contact with the sides of said press band, and conduit means in said means for supplying hardener part for conveying the hardener into said recess for flow therefrom between said inner and outer bands.

72. Apparatus, as set forth in claim 70, wherein one surface of said recess is located opposite a surface of said inner band and another surface of said recess is located opposite a surface of said outer band, and said surfaces of said recess are coated with a dry anti-friction material in contact with the surfaces of the inner band and the outer band for facilitating the sliding movement of said inner band and outer band relative to the surfaces of said recess.

73. Apparatus, as set forth in claim 71, wherein one surface of said recess is located opposite a surface of said inner band and another surface of said recess is located opposite a surface of said outer band, and said surfaces of said recess are coated with a dry anti-friction material in contact with the surfaces of the inner band and the outer band for facilitating the sliding movement of said inner band and outer band relative to the surfaces of said recess.

74. Apparatus, as set forth in claim 72, wherein said anti-friction layer is formed of a copper metal matrix having pores embedded with graphite.

75. Apparatus, as set forth in claim 73, wherein said anti-friction layer is formed of a copper metal matrix having pores embedded with graphite.

76. Apparatus, as set forth in claim 72, wherein the dry anti-friction coating comprises an alloy of tin-bronze.

77. Apparatus, as set forth in claim 73, wherein the dry anti-friction coating comprises an alloy of tin-bronze.

78. Apparatus, as set forth in claim 70, wherein said sealing element comprises a metal-rubber element.

79. Apparatus, as set forth in claim 71, wherein said sealing element comprises a metal-rubber element.

80. Apparatus, as set forth in claim 73, wherein the sealing element is formed of Viton.

81. Apparatus, as set forth in claim 79, wherein the sealing element is formed of Viton.

82. Apparatus, as set forth in claim 70, wherein said conduit means includes a bore passing through the seal into the channels in said press bands.

83. Apparatus, as set forth in claim 71, wherein said conduit means includes a bore passing through the seal into the channels in said press bands.

84. Apparatus, as set forth in claim 72, wherein said conduit means comprises a bore extending through said dry anti-friction layer and arranged to align with an opening in said inner band for conveying hardener into the channels in said press band.

85. Apparatus, as set forth in claim 73, wherein said conduit means comprises a bore extending through said dry anti-friction layer and arranged to align with an opening in said inner band for conveying hardener into the channels in said press band.

86. Apparatus, as set forth in claim 4, wherein said outer band of said press band has openings therethrough spaced apart across said band between the sides thereof.

87. Apparatus, as set forth in claim 7, wherein said outer band of said press band has openings therethrough spaced apart across said band between the sides thereof.

88. Apparatus, as set forth in claim 86, wherein said openings in said outer band are also spaced apart in the travel direction of travel of said press band.

89. Apparatus, as set forth in claim 87, wherein said openings in said outer band are also spaced apart in the travel direction of travel of said press band.

90. Apparatus, as set forth in claim 88, wherein the spacing of the openings in said outer band is based on the quantity of hardener to be supplied therethrough.

91. Apparatus, as set forth in claim 89, wherein the spacing of the openings in said outer band is based on the quantity of hardener to be supplied therethrough.

92. Apparatus, as set forth in claim 86, wherein said openings are in the form of slots elongated in the travel direction of said press band.

93. Apparatus, as set forth in claim 87, wherein said openings are in the form of slots elongated in the travel direction of said press band.

94. Apparatus, as set forth in claim 92, wherein said slots have a trapezoidal cross-section with one pair of opposite sides tapering inwardly toward one another toward the surface of said outer band in contact with said mat.

95. Apparatus, as set forth in claim 93, wherein said slots have a trapezoidal cross-section with one pair of opposite sides tapering inwardly toward one another toward the surface of said outer band in contact with said mat.

96. Apparatus, as set forth in claim 92, wherein said slots have a width of approximately 0.1 to 0.2 mm.

97. Apparatus, as set forth in claim 93, wherein said slots have a width of approximately 0.1 to 0.2 mm.

98. Apparatus, as set forth in claim 86, wherein a roller is located adjacent and outwardly from the outlet of said double band press, said roller has radially outwardly projecting teeth spaced thereon at the same spacing as the openings in the outer band so that said teeth engage in the openings for ejecting resin residues.

99. Apparatus, as set forth in claim 87, wherein a roller is located adjacent and outwardly from the outlet of said double band press, said roller has radially outwardly projecting teeth spaced thereon at the same spacing as the openings in the outer band so that said teeth engage in the openings for ejecting resin residues.

100. Apparatus, as set forth in claim 98, wherein a suction device corresponding to the supply device is located downstream of the roller in the direction of movement of the press band and said suction device is connected to a negative pressure source for evacuating resin residues from the channels in said press bands.

101. Apparatus, as set forth in claim 99, wherein a suction device corresponding to the means for supplying hardener is located downstream of the roller in the direction of movement of the press band and said suction device is connected to a negative pressure source for evacuating resin residues from the channels in said press bands.

* * * * *